United States Patent
Kim

(10) Patent No.: US 7,362,227 B2
(45) Date of Patent: Apr. 22, 2008

(54) ANTI-THEFT AND SECURITY SYSTEM FOR COMPUTERS

(76) Inventor: Walter Taehwan Kim, 8226 E. Blackwillow Cir., #202, Anaheim Hills, CA (US) 92808

( * ) Notice: Subject to any disclaimer, the term of this patent is extended or adjusted under 35 U.S.C. 154(b) by 252 days.

(21) Appl. No.: 11/337,351

(22) Filed: Jan. 23, 2006

(65) Prior Publication Data

US 2006/0152365 A1 Jul. 13, 2006

Related U.S. Application Data

(63) Continuation-in-part of application No. 10/752,266, filed on Jan. 6, 2004, now Pat. No. 7,026,933.

(60) Provisional application No. 60/511,472, filed on Oct. 15, 2003.

(51) Int. Cl.
- G08B 1/08 (2006.01)
- G08B 13/12 (2006.01)
- G08B 13/14 (2006.01)
- G08B 21/00 (2006.01)
- G01P 15/00 (2006.01)

(52) U.S. Cl. .............. 340/571; 340/539.1; 340/539.15; 340/568.1; 340/568.2; 340/568.3; 340/572.1; 340/572.3; 340/572.9; 340/686.1; 340/686.4; 702/141

(58) Field of Classification Search ............. 340/539.1, 340/539.15, 568.1, 568.2, 568.3, 572.1, 686.1, 340/686.4; 702/141
See application file for complete search history.

(56) References Cited

U.S. PATENT DOCUMENTS

| | | | | | |
|---|---|---|---|---|---|
| 5,760,690 | A | * | 6/1998 | French | 340/571 |
| 6,137,409 | A | * | 10/2000 | Stephens | 340/568.1 |
| 6,282,655 | B1 | * | 8/2001 | Given | 726/34 |
| 6,654,890 | B1 | * | 11/2003 | Girard | 726/35 |
| 6,983,888 | B2 | * | 1/2006 | Weng | 235/492 |
| 7,130,656 | B2 | * | 10/2006 | Okagaki et al. | 455/557 |
| 2003/0014660 | A1 | * | 1/2003 | Verplaetse et al. | 713/200 |
| 2003/0095044 | A1 | * | 5/2003 | Lin et al. | 340/568.2 |
| 2005/0033546 | A1 | * | 2/2005 | Hamaguchi et al. | 702/141 |

* cited by examiner

*Primary Examiner*—Benjamin C. Lee
*Assistant Examiner*—Lam Pham

(57) ABSTRACT

A system is disclosed for preventing an unauthorized person from use a portable computer having an external port. The system includes a control device capable of connecting to an external port of the portable computer. The control device includes a wireless receiver to receive wireless signals. The control device is capable of enabling and disabling a security function executed by the computer based on a wireless signal received by the wireless receiver.

24 Claims, 7 Drawing Sheets

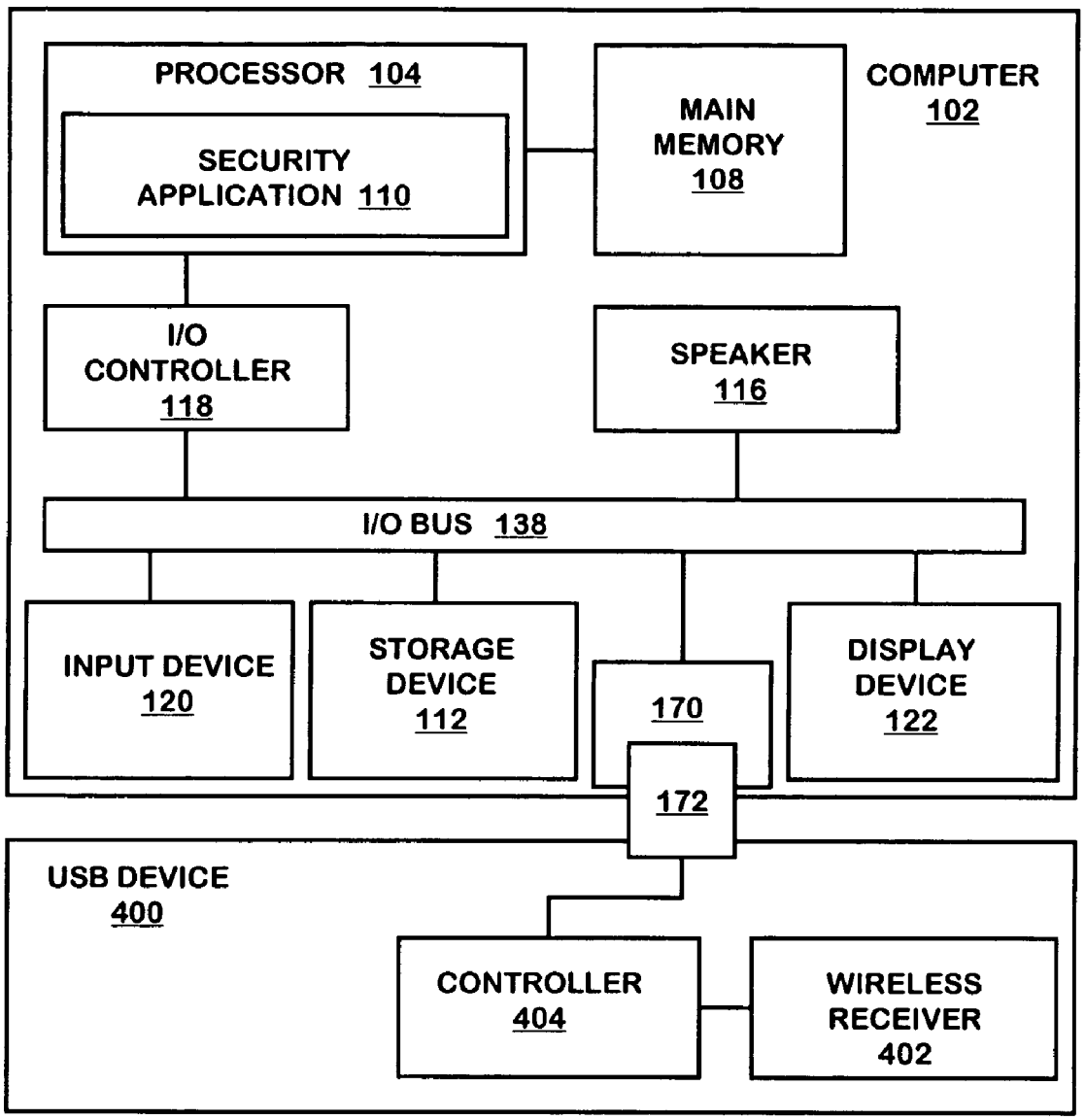
FIG. 4
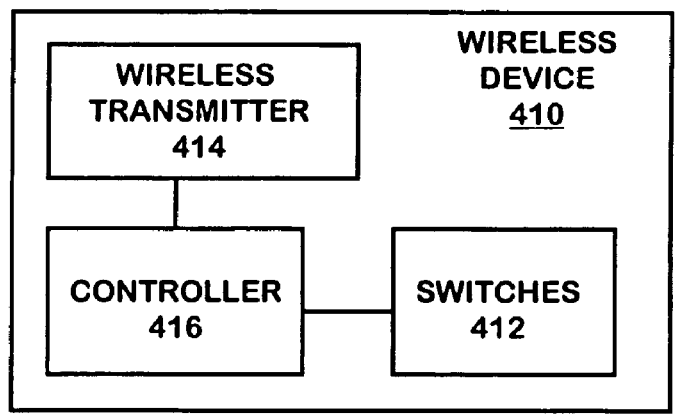

ANTI-THEFT AND SECURITY SYSTEM FOR COMPUTERS

CROSS-REFERENCE TO RELATED APPLICATION

This application is a continuation-in-part of U.S. patent application Ser. No. 10/752,266, filed Jan. 6, 2004 now U.S. Pat. No. 7,026,933, which claims the benefit of priority to U.S. Provisional Patent Application Ser. No. 60/511,472, filed Oct. 15, 2003. The entire disclosure of each of U.S. patent application Ser. No. 10/752,266 and the U.S. Provisional Patent Application Ser. No. 60/511,472 is incorporated herein, in its entirety, by reference.

BACKGROUND

1. Field

Embodiments relate to anti-theft and/or security system for electronic devices, such as portable and non-portable computers and display devices.

2. Background

Various anti-theft devices have been proposed to prevent the theft of electronic devices, such as portable and non-portable computers. For example, a combination of a cable and a lock may be used to prevent theft of a portable computer by anchoring the portable computer to a structure that cannot be easily moved. As another example, a portable anti-theft device containing a motion sensor may be used to prevent theft of a portable computer by securely attaching the anti-theft device to the portable computer using a combination of a cable and a lock. When the anti-theft device is activated, the motion sensor incorporated within the portable anti-theft device triggers an audible alarm signal in response to movement of the portable computer to which the anti-theft device is attached.

There are a number of disadvantages associated with the above-described devices. For one thing, each time a user needs to set up the portable computer at another location, the user must manually attach the above-described devices to the portable computer using a cumbersome cable and lock combination. One of the major benefits of having a portable computer is that it can be easily carried to many locations and it can be easily set up at the selected locations. Therefore, extra efforts required in manually attaching such anti-theft devices to a portable computer using a cable and lock combination decrease the usefulness of the portable computer and/or the desirability of using such anti-theft devices.

SUMMARY

In accordance with one embodiment of the present invention, a system is described for preventing an unauthorized person from use a portable computer having an external port. The system includes a control device capable of connecting to an external port of the portable computer. The control device includes a wireless receiver to receive wireless signals. The control device is capable of enabling and disabling a security function executed by the computer based on a wireless signal received by the wireless receiver.

BRIEF DESCRIPTION OF THE DRAWINGS

The invention is illustrated by way of example and not by way of limitation in the figures of the accompanying drawings in which like references indicate similar elements. It should be noted that the references to "an" or "one" embodiment of this disclosure are not necessarily to the same embodiment, and such references mean at least one.

FIG. 4 shows a block diagram of a security system for a computer according to one embodiment of the invention.

DETAILED DESCRIPTION

In the following description, specific details are set forth in order to provide a thorough understanding of the present invention. However, it will be apparent to one skilled in the art that the present invention may be practiced without these specific details. In other instances, well-known hardware and software components, structures and techniques have not been shown in detail in order to avoid obscuring the present invention.

Figure 1:
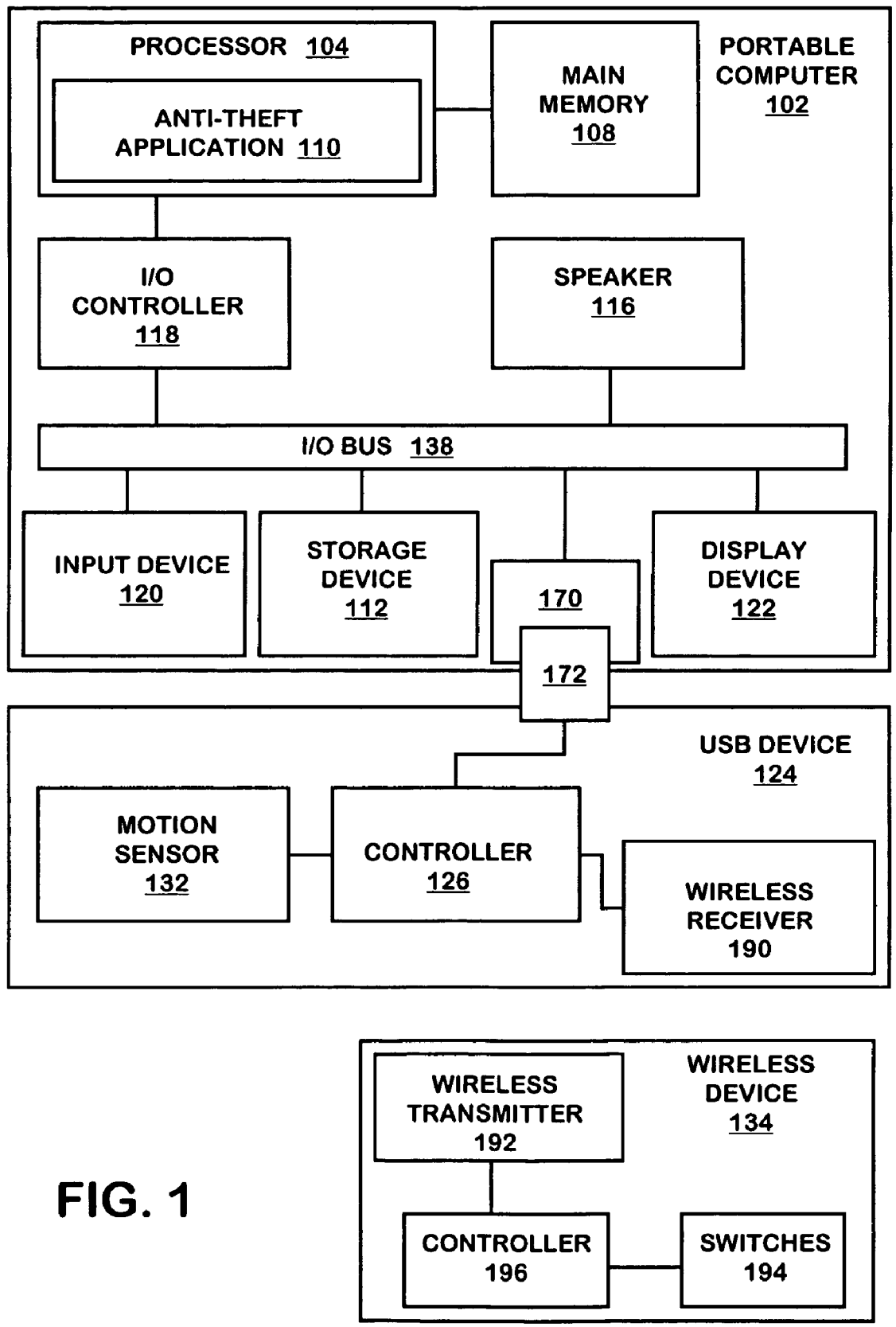
FIG. 1 shows a block diagram of an anti-theft system for a computer according to one embodiment of the invention.

FIG. 1 is a block diagram of an anti-theft system for a computer according to one embodiment of the invention. Illustrated in FIG. 1 is an example of a computer 102 to which the anti-theft system according to one embodiment of the invention may be implemented. In one embodiment the anti-theft system is used to prevent theft of a portable computer 102. However, it should be noted that the anti-theft system may also be used with non-portable computers. The portable computer 102 includes a processor 104 coupled to a main memory 108 and a number of I/O devices coupled to an I/O controller 118 via an I/O bus 118. The I/O devices may include input devices, such as a keyboard and a pointing device 120, a storage device 112 (e.g., hard disk drive), a display device 122 and a speaker 116.

In one embodiment, the anti-theft system uses a removable USB device 124 coupled to the portable computer 102 to detect a possible unauthorized taking of the portable computer. In one embodiment, the USB device is capable being removably coupled to an external USB port of a computer. In the illustrated embodiment, the USB device includes a wireless receiver 190 capable of receiving wireless signals. In one embodiment, the USB device 124 includes an enclosure that contains a controller 126 and a connector 172 to connect the USB device 124 to a USB (Universal Serial Bus) port 170 of the computer 102. In use, the controller 126, located within the enclosure, may communicate with the portable computer 102 to enable and disable an alarm sub-system implemented by the computer, based on a wireless signal received by the wireless receiver 190. In one embodiment, the connector 172 of the USB device 124 is fixedly and directly connected to the enclosure of the USB device. In one embodiment, when the USB device 124 is coupled to the computer, the enclosure of the USB device is disposed external to the computer.

In one embodiment, the anti-theft system is configured to trigger an audible alarm based on a signal generated within the USB device 124. In one embodiment, the USB device 124 includes a motion sensor 132 to enable detection of the movement thereof. The motion sensor 132 may comprise a mercury switch, a piezoresistive switch, an accelerometer, a gyroscope, an angle sensor or any other mechanism sensitive to displacement motion and/or angular motion. The motion sensor 132 is electronically coupled to the controller 126. When the USB device 124 connected to the portable computer 102 is moved by a person, the controller 126 in conjunction with the motion sensor 132 will generate a motion signal indicating that the USB device 124 is being moved from a stationary position.

The anti-theft system also includes an alarm sub-system to cause an audible alarm to be generated if a movement of the USB device 124 is detected while the alarm sub-system is enabled. In one embodiment, the alarm sub-system is implemented within the computer. In one embodiment, the alarm sub-system comprises an anti-theft application 110 executed within the portable computer 102, which causes the speaker to sound an audible alarm when certain conditions are satisfied. More specifically, the anti-theft application 110 running in the portable computer is in communication with the USB device 124 and uses a signal generated within the USB device 124 to determine if an audible alarm needs to be activated and/or deactivated. In one embodiment, the anti-theft application 110 running in the portable computer 102 is configured to cause the speaker 116 to produce an audible alarm in response to the motion signal generated by the motion sensor 132 while the alarm sub-system is enabled.

In one embodiment, the anti-theft system is capable of determining if the USB device 124 has been unplugged from the portable computer 102. This may be accomplished in a number of different ways. For example, the unplugging of the USB device 124 may be recognized by the anti-theft application 110 when a communication with the USB device cannot be established. As another example, the unplugging of the USB device 124 may be recognized by the operating system running in the computer and this information may be communicated from the operating system to the anti-theft application 110. In one embodiment, the anti-theft system is configured to cause the audible alarm to be generated if it detects that the USB device 124 has been unplugged from the portable computer 102 while the alarm sub-system is enabled.

In one embodiment, the anti-theft system includes a user-interface to allow a user to enable and disable the alarm sub-system. In one embodiment, the anti-theft system includes a wireless device 134 having a wireless transmitter 192 for transmitting wireless signals to the USB device 124. The anti-theft system is configured such that the alarm sub-system can be enabled and/or disabled by using the switches 194 provided on the wireless device 134. The wireless signal transmitted by the wireless device 134 is received by the wireless receiver 190 of the USB device 124 and is processed by the controller 126 located within the USB device. The controller 126 of the USB device 124 is in communication with the anti-theft application 110 and is configured to enable and disable an alarm sub-system implemented by the computer, based on a wireless signal received by the wireless receiver 190.

Figure 2:
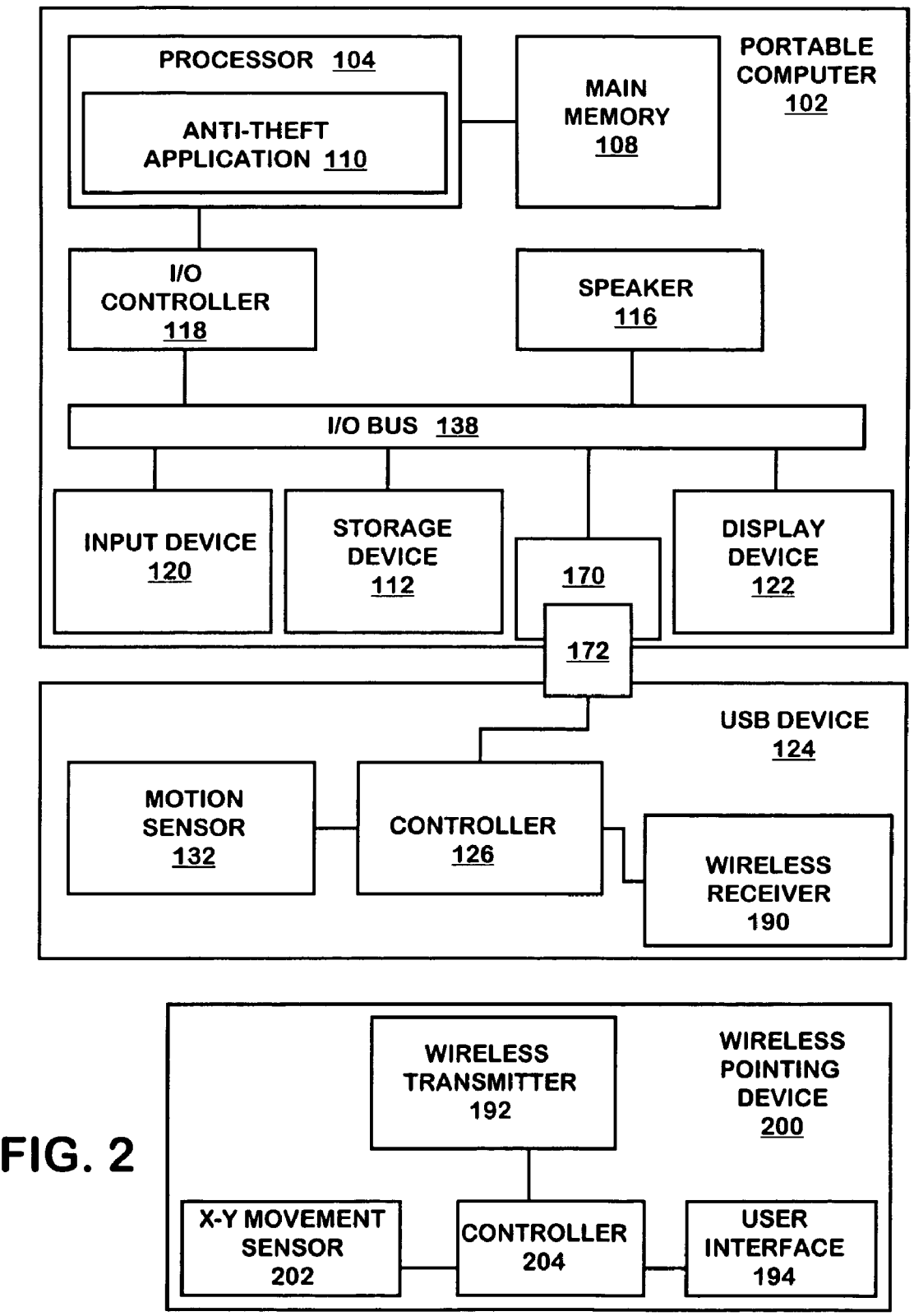
FIG. 2 shows a block diagram of an anti-theft system for a computer according to another embodiment of the invention.

In another embodiment, the wireless device to enable a user to enable and disable the alarm sub-system is embodied in a form of a wireless pointing device 200, as shown in FIG. 2. The term "pointing device" is used to describe a computer input device that may be used, for example, for positioning a cursor on a computer video display. In one embodiment, the wireless pointing device 200 includes an enclosure that lies flat on a support surface and one or more user-actuated switches or buttons 194 located externally of the enclosure, an X-Y movement sensor 202, a controller 204 and a wireless transmitter 192 to enable wireless communication with the USB receiver device 124. In use, the controller 204, located within the enclosure, convert the X and Y movement of the pointing device 200 and switch information into digital information, which is supplied to the portable computer 102. Software running in the portable computer 102 uses the motion and switch information to perform various functions, for example, repositioning the cursor on the computer display screen 122. In this embodiment, the user interface 194 provided on the wireless pointing device 200 may be used by a user to enable and disable the alarm-subsystem. In one embodiment, the user interface 194 provided on the pointing device includes a numeric keypad and a small LCD display provided on the enclosure of the pointing device. In this regard, the alarm sub-system can be enabled and/or disabled by enter a predefined code using the numeric keypad provided on the pointing device. In another embodiment, the alarm sub-system may be enabled or disabled by using the conventional pointing device buttons provided on the pointing device.

Figure 3:
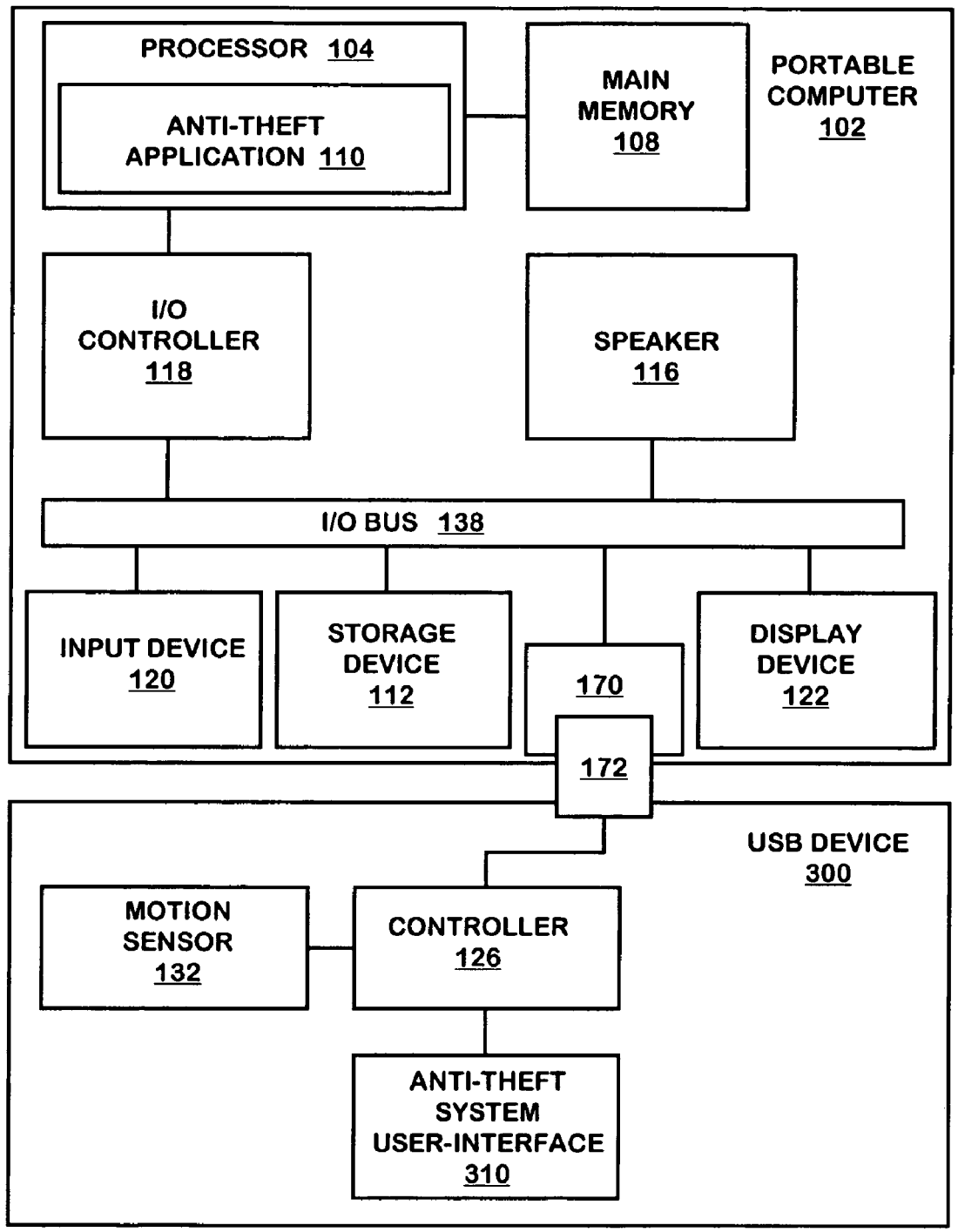
FIG. 3 shows a block diagram of an anti-theft system for a computer according to yet another embodiment of the invention.

In yet another embodiment, a user-interface 310 for enabling and disabling the alarm sub-system is provided on the enclosure of the USB device 300, as shown in FIG. 3. In one embodiment, the user-interface 310 may be embodied in a form of a numeric keypad and a small LCD display provided on the enclosure of the USB device 300. In this regard, the alarm sub-system can be enabled and/or disabled by enter a predefined code using the numeric keypad provided on the USB device.

FIG. 4 shows a block diagram of a security system for a computer according to one embodiment of the invention. In this embodiment, the security application 110 is capable of detecting when someone tries to access the computer. A security sub-system of the computer may be enabled and disabled using the wireless device 410 and the USB device 400 coupled to the computer. In use, when someone tries to access the computer while the security sub-system is enabled, the security application 110 executed within the computer will generate an audible alarm or a warning (either visually or audibly) to indicate that the security sub-system is turned on and that nobody can access the computer unless the alarm sub-system is properly turned off. Accordingly, the security application 110 will prevent any person from access a portion or entire portion of the storage device 112 of the computer when the security sub-system is turned on. This embodiment provide a simple way to turn on and off a security system implemented by the computer by using the USB wireless receiver device 400 and a wireless remote control device 410.

Figure 5:
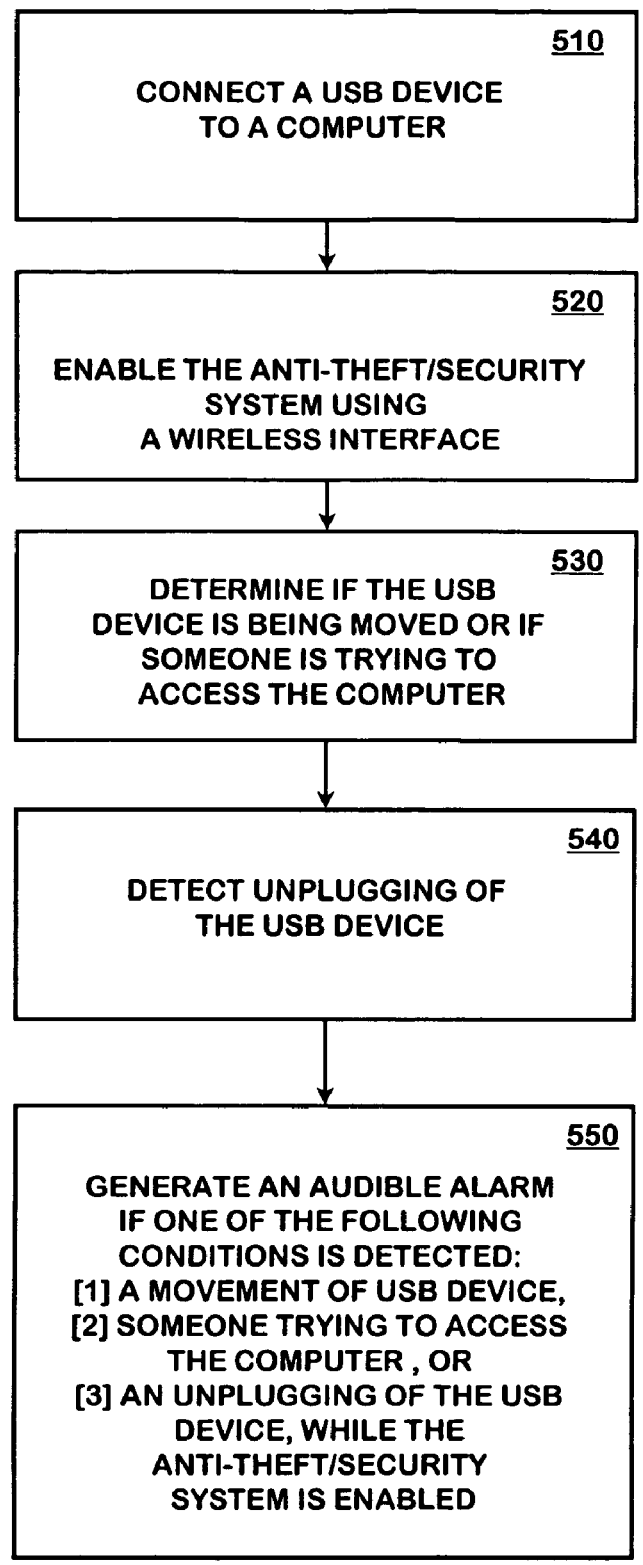
FIG. 5 shows a flowchart diagram illustrating a method of preventing an unauthorized person from moving or stealing a portable computer according to one embodiment of the invention.

FIG. 5 shows a flowchart diagram illustrating a method of preventing an unauthorized person from moving or stealing a portable computer according to one embodiment of the invention. In block 510, a user sets up a portable computer by connecting a USB device to the portable computer. When the user has to leave the portable computer unattended, the user may interact with a user interface to enable an anti-theft/security system incorporated within the portable computer and/or the USB device in block 520. In one embodiment, the anti-theft/security system is enabled by using a wireless transmitter device to communicate with a wireless receiver incorporated within the USB device. The anti-theft/ security system may comprise an application program running in the portable computer, which is in communication with the USB device. In accordance with one aspect of one embodiment, the anti-theft/security system causes an audible sound to be generated based on a signal generated within the USB device. In one embodiment, the anti-theft/security system is capable of detecting a movement of the USB device, detecting when someone tries to access the computer and/or detecting unplugging of the USB device. Accordingly, in block 530, the anti-theft/security system determines if the USB device is being moved or if someone is trying to access the computer. Additionally, in block 540, the anti-theft/security system determines if the USB device has been unplugged from the portable computer. Then in block 550, the anti-theft/security system generates an audible alarm or a warning [1] if the movement of the USB device is detected, [2] if someone tries to access the computer, or [3] if the unplugging of the USB device is detected, while the anti-theft/security system is enabled. When the user is ready to use the portable computer again, the user may disable the anti-theft/security system via the wireless transmitter device.

In one embodiment, the anti-theft/security system prevents turning off or rebooting of the computer when the anti-theft/security system is enabled. In one embodiment, the anti-theft/security system prevents unauthorized use of the computer (e.g., prevents others from accessing the hard drive) when the anti-theft/security system is enabled.

Figure 6:
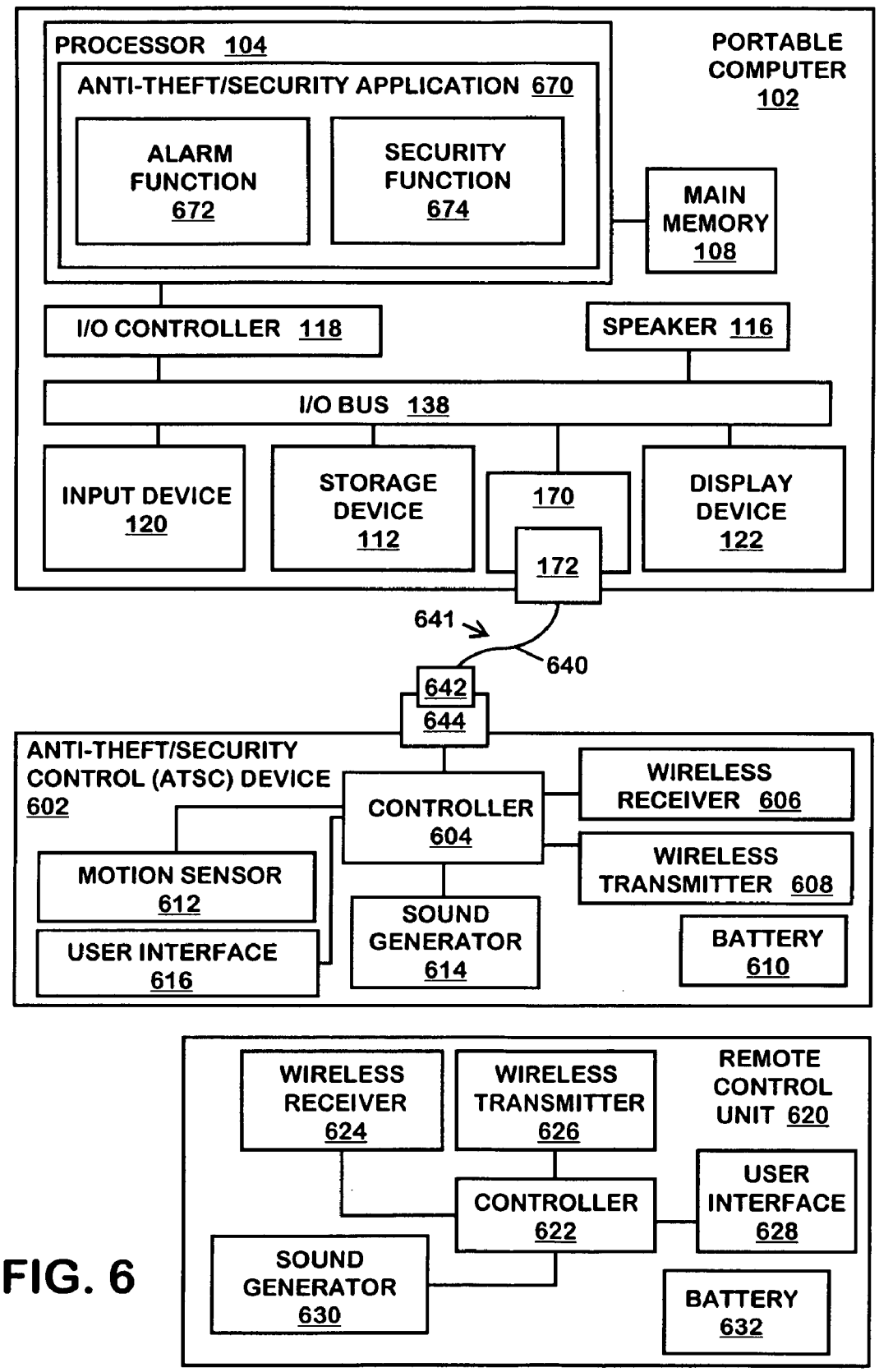
FIG. 6 shows a block diagram of an anti-theft/security system for a computer according one embodiment of the invention.

FIG. 6 is a block diagram of an anti-theft/security system for the portable computer 102 according one embodiment of the invention. The anti-theft/security system uses an anti-theft/security control (ATSC) device 602 which is configured to removably connect to an external port 170 of the portable computer 102 to detect a possible unauthorized taking and/or use of the portable computer. In one embodiment, the ATSC device 602 is capable being removably coupled to an external USB port 170 of a computer.

The ATSC device 602 comprises a number of functional elements, including a controller 604, a wireless receiver 606, a wireless transmitter 608, a temporary electrical power storage or rechargeable battery 610, a motion sensor 612, a user alerting device (e.g., sound generator) 614 and an user interface 616. The ATSC device 602 further comprises an enclosure to contain the components thereof and a connector member 641 to connect the ATSC device 602 to the external port 170 of the computer 102. In the illustrated embodiment, the connector member 641 comprises a first connection section 642, a second connector section 172 and a flexible cable 640 connected between the connector sections 644 and 172. In one embodiment, the connector member 641 is removably connected between the external port 170 of the computer 102 and a port 644 (e.g., external port) of the ATSC device 602. In one embodiment, when the ATSC device 602 is coupled to the computer 102 via the connector member 641, the enclosure of the ATSC device 602 is disposed external to the computer 102.

In use, the controller 604 of the ATSC device 602 communicates with the portable computer 102 to enable and disable an alarm function 672 (also referred herein as "anti-theft" function) and/or a security function 674 of the computer 102, based on a wireless signal received by the wireless receiver 606. In one embodiment, the alarm function 672 comprises software instructions executed by the processor 104 of the computer 102 which cases an audible alarm to be generated if a movement of the ATSC device 602 is detected while the alarm function is enabled. The security function 674 comprises software instructions executed by the processor 104 of the computer 102 which prevents access to at least a portion of the storage device 112 of the computer when the security function is enabled.

In a preferred embodiment, the ATSC device 602 simultaneously enables both the alarm function 602 and the security function 674 when an enable signal is received by the wireless receiver 606 of the ATSC device from the remote control unit 620. Additionally, in the preferred embodiment, the ATSC device 602 simultaneously disables both the alarm function 602 and the security function 674 when a disable signal is received by the wireless receiver 606 of the ATSC device from the remote control unit 620.

In one embodiment, the anti-theft/security application 670 executed by the computer 102 is configured to trigger an audible alarm based on a signal (e.g., a motion signal) generated within the ATSC device 602. More specifically, when the ATSC device 602 connected to the portable computer 102 is moved by a person while the alarm function 672 is enabled, the controller 604 of the ATSC device 602 in conjunction with the motion sensor 612 will generate a motion signal indicating that the ATSC device 602 is being moved from a stationary position.

In one embodiment, the ATSC device 602 is configured to be attached to a top cover of a portable computer. Typically, a portable computer (e.g., notebook computer) includes a top cover pivotally connected to a base unit via hinge mechanisms. Typically, to use a portable computer, the top cover is pivoted upward and tilted backward, relative to the base unit, to allow visual access to the display screen and physical access to the keyboard and on-off switch of the computer. In one embodiment, the motion sensor 612 contained in the ATSC device 602 is sensitive to and is able to detect changes in tilting angle of the top cover of the portable computer 102. In this regard, because the ATSC device 602 is attached to the top cover of the portable computer, the ATSC device 602 is able to detect when someone is trying to open the top cover of the portable computer based on signals generated by the motion sensor 612 located inside the ATSC device 602. This regard, an audible alarm may be triggered as soon as someone tries to open the top cover of the portable computer while the alarm function is enabled to prevent others from opening the top cover of the portable computer and/or turning off the computer 102 while the portable computer is left unattended.

In one embodiment, adhesive material is used to non-removably or permanently attach the bottom surface of the enclosure of the ATSC device 602 to an upper surface of the top cover of the portable computer 102. Other suitable mounting methods may be used to fixedly and/or permanently attach the ATSC device 602 to any portion of the casing of the portable computer, including use of fasteners or mounting structures. In one embodiment, the ATSC device 602 is attached to the casing of the portable computer 102 such that the ATSC device 602 cannot be detached from the portable computer without damaging at least a portion of the enclosure of the ATSC device 602.

The user interface 616 provided on the enclosure of the ATSC device 602 may be used by a user to selectively enable and disable the alarm function 672 and/or the security function 674 executed by the computer 102. The user interface 616 may include a numeric keypad and a small LCD display provided on the enclosure of the ATSC device 602 to allow the user to enter a predefined code or password using the numeric keypad. Alternatively or in addition to the keypad, the user interface 616 includes a sensor that scans fingerprints, which may be used to activate and deactivate the alarm function 672 and/or the security function 674 executed by the computer 102. Alternatively or in addition to the user interface 616, the ATSC device 602 may employ a wireless remote control unit 620 to conveniently activate and deactivate the alarm function and/or the security function merely by interacting with a user interface 628 (e.g., buttons) provided on the remote control unit 602. In one embodiment, one or more LEDs are provided on the enclosure of the ATSC device 602, which are used to indicate to others and to the user whether the alarm function and/or the security function is currently activated or deactivated.

In one embodiment, the alarm function 672 causes an audible alarm to be generated if a movement of the ATSC device 602 is detected while the alarm function is enabled. In one embodiment, the alarm function 672 is implemented by an anti-theft/security application 670 executed within the portable computer 102, which causes the speaker 116 to sound an audible alarm when certain conditions are satisfied. More specifically, the anti-theft/security application 670 running in the portable computer 102 is in communication with the ATSC device 602 and uses a signal generated within the ATSC device 602 to determine if an audible alarm needs to be activated and/or deactivated. In one embodiment, the anti-theft/security application 670 running in the portable computer 102 is configured to cause the speaker 116 to produce an audible alarm in response to the motion signal generated by the motion sensor 612 of the ATSC device 602 while the alarm function is enabled.

In one embodiment, an alarm function is implemented within the ATSC device 602 in addition to or alternatively to the alarm function executed by the portable computer 102. The alarm function of the ATSC device 602 comprises a user alerting device, such as, for example, a sound generator 614 and a temporary electrical power storage or rechargeable battery 610 contained within the enclosure of the ATSC device 602. The temporary power storage or rechargeable battery 610 gets charged while the ATSC device 602 is powered by the portable computer 102. In the event the ATSC device 602 becomes disconnected from the portable computer 102, the electrical power from the temporary power storage or rechargeable battery 610 is used to supply power to the controller 604 and the sound generator 614 to generate an audible alarm. The controller 604 of the ATSC device 602 is configured to cause the sound generator 614 to sound an audible alarm based on a signal generated by the motion sensor 612 while the alarm function is enabled.

As mentioned above, the anti-theft/security application 670 includes security function 674 in addition to the above-mentioned alarm functions. The security function 674 of the application 670 is configured to detect when someone trying to access the computer 102. The security function 674 may be enabled and disabled in conjunction with enabling and disabling of the alarm function 672. In use, when someone tries to access the computer while the security function 674 has been enabled, the anti-theft/security application 670 executed by the computer 102 will generate an audible alarm and/or a warning (either visually or audibly) to indicate that the security function 674 is enabled and that nobody can access the computer 102 unless the security function is properly disabled. Accordingly, the application 670 will prevent any person from accessing a portion of or the entire the storage device 112 of the computer 102 when the security function is enabled.

The wireless remote control unit 620 allows a user to enable and disable the alarm function 672 and/or the security function 674. In a preferred embodiment, a user can conveniently enable both the security function and the alarm function implemented by the computer by simply pressing a single button provided on the wireless remote control unit 620 to wirelessly communicate with the ATSC device 602, which in turn communicates with the application 670 running in the computer to turn on both the security function and the alarm function. Similarly, in a preferred embodiment, a user can conveniently disable both the security function and the alarm function implemented by the computer by simply pressing a single button (which may be a separate button different from the button used to enable the security and alarm functions) provided on the wireless remote control unit 620 to wirelessly communicate with the ATSC device 602, which in turn communicates with the application 670 running in the computer to turn off both the security function and the alarm function.

The remote control unit 620 comprises a number of functional elements, including a controller 622, a wireless receiver 624, a wireless transmitter 626, a user interface 628, a sound generator 630 and a battery 632. As noted above, the anti-theft/security system is configured such that the alarm function 672 and the security function 674 can be enabled and disabled by using the user interface 628 (e.g., buttons) provided on the remote control unit 620. The wireless signal transmitted by the transmitter 626 of the remote control unit 620 is received by the receiver 606 of the ATSC device 602 and is processed by the controller 604 located within the ATSC device 602. The controller 604 of the ATSC device 602 is able to send a signal or message to the anti-theft/security application 670 executed by the computer 102 to enable or disable the alarm function 672 and/or the security function 674 implemented thereby.

In one embodiment, when a movement of the ATSC device 602 is detected while the alarm function 672 is enabled, the ATSC device 602 is configured to send a signal or message to the remote control unit 620 to indicate a possible unauthorized taking of the computer 102. The communication from the ATSC device 602 to the remote control unit 620 is accomplished by using the wireless transmitter 608 of the ATSC device 602 to transmit a wireless signal or message to the remote control unit 620. When the wireless signal or message transmitted by the ATSC device 602 is received by the wireless receiver 624 of the remote control unit 620, the remote control unit 620 will cause the sound generator 630 to generate an audible alarm to alert the user of a possible theft of the computer 102.

Similarly, when someone attempts to access the computer 102 while the security function is enabled, the ATSC device 602 is configured to send a signal or message to the remote control unit 620 to indicate a possible attempt to access the computer 102 while the computer remains unattended. The communication from the ATSC device 602 to the remote control unit 620 is accomplished by using the wireless transmitter 608 of the ATSC device 602 to transmit a wireless signal or message to the remote control unit 620. When the wireless signal or message transmitted by the ATSC device 602 is received by the wireless receiver 624 of the remote control unit 620, the remote control unit 620 will cause the sound generator 630 to generate an audible alarm to alert the user of a possible unauthorized attempt to access or use the computer 102.

Figure 7:
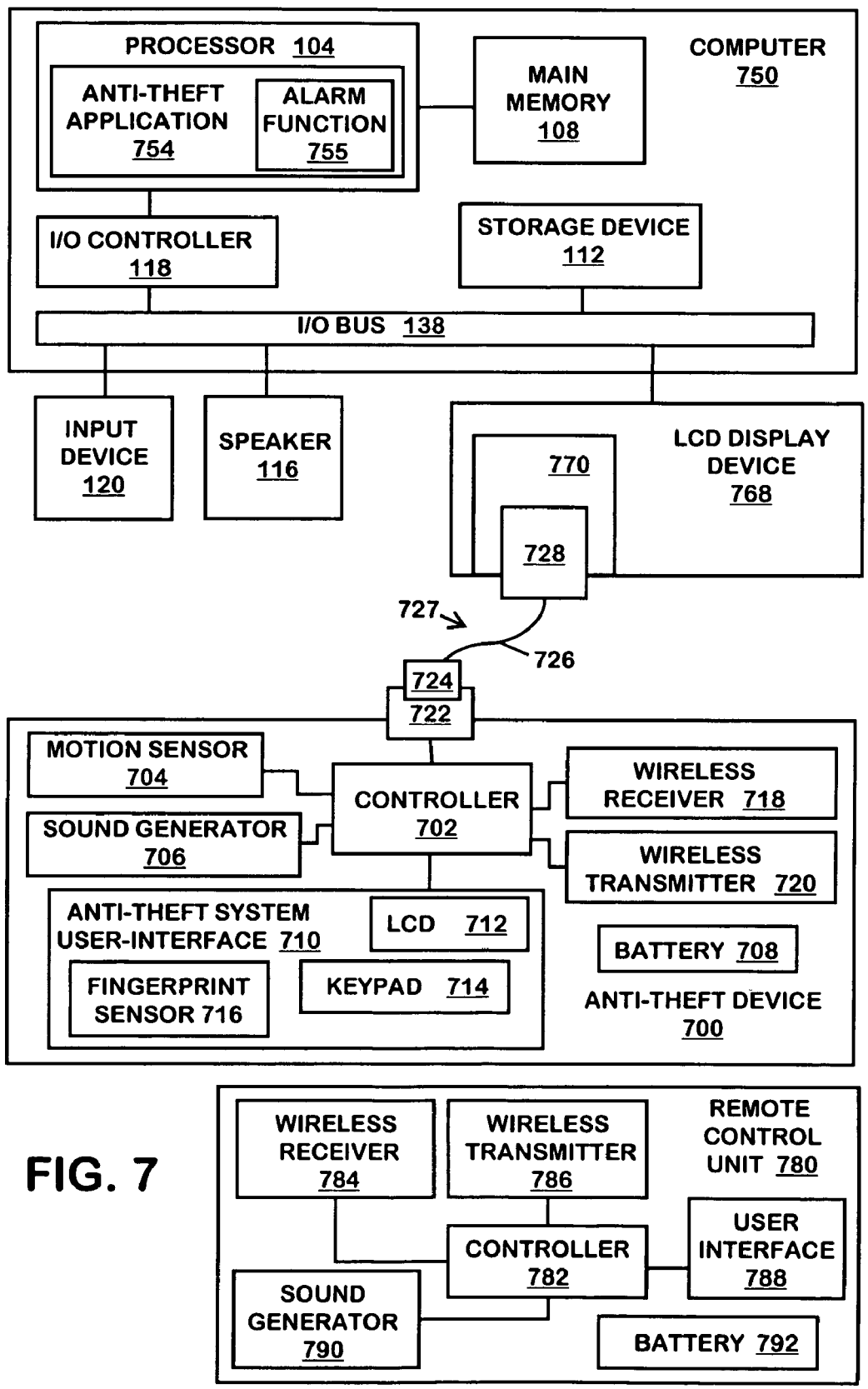
FIG. 7 shows a block diagram of an anti-theft system for a display device according to one embodiment of the invention.

FIG. 7 is a block diagram of an anti-theft system for a display device according to one embodiment of the invention. The anti-theft system employs an anti-theft device 700 which is configured to removably connect to an external port 770 of a display device 768 (e.g., LCD monitor) to detect an unauthorized taking of the display device 768 while it remains unattended. In one embodiment, the anti-theft device 700 is capable being removably coupled to an external USB port 770 of the display device 768. The anti-theft device 700 may be used to prevent theft of an LCD (liquid-crystal display) monitor 768 (referred herein as "display device") connected to a desktop computer 750. Recently, the commercially available LCD monitor display devices include a number of external ports, such as USB ports, which are in communication with the host computer. In accordance with one embodiment, the anti-theft device 700 is configured to removably couple to one of the external ports of the display device 768 and establish communication with the host computer 750 via the communication connection (e.g., cable) between the display device and the host computer.

The anti-theft device 700 comprises a number of functional elements, including a controller 702, a wireless receiver 718, a wireless transmitter 720, a temporary electrical power storage or rechargeable battery 708, a motion sensor 704, a user alerting device (e.g., sound generator) 706 and an anti-theft system user interface 710. The anti-theft device 700 further comprises an enclosure to contain the components thereof and a connector member 727 to connect the anti-theft device 700 to the external port 770 of the LCD display device 768. In the illustrated embodiment, the connector member 727 comprises a first connection section 724, a second connector section 728 and a flexible cable 726 connected between the first and second connector sections 724 and 728. In one embodiment, the connector member 727 is removably connected between the external port 770 of the display device 768 and an external port 722 of the anti-theft device 700. In one embodiment, when the anti-theft device 700 is coupled to the display device 768 via the connector member 727, the enclosure of the anti-theft device 700 is disposed external to the display device 768.

In use, the anti-theft device 700 connected with the display device 768 is capable of communicating with the host computer 750 to enable and disable an alarm function 755. In one embodiment, the alarm function 755 comprises software instructions executed by the processor 104 of the computer 750 which cases an audible alarm to be generated if a movement of the anti-theft device 700 is detected while the alarm function is enabled. In on embodiment, the alarm function 755 is a process of an anti-theft application 754 executed by the computer 750. In accordance with one feature of one embodiment, the alarm-function 755 is configured to trigger an audible alarm based on a signal (e.g., a motion signal) generated within the anti-theft device 700. More specifically, when the anti-theft device 700 connected to the display device 768 is moved by a person while the alarm function 755 is enabled, the controller 702 of the anti-theft device 700 in conjunction with the motion sensor 704 will generate a motion signal indicating that the anti-theft device 700 is being moved from a stationary position.

In one embodiment, the anti-theft device 700 is configured to be attached to a rear side of the display device 768. Typically, a display device (e.g., LCD monitor) includes a front display screen and a rear side thereof provided with a casing to protect the components of the display device. In one embodiment, adhesive material is used to non-removably or permanently attach the enclosure of the anti-theft device 700 to the rear side of the display device 768. Other suitable mounting methods may be used to fixedly and/or permanently attach the anti-theft device 700 to any portion of the casing of the display device 768, including use of fasteners or mounting structures. In one embodiment, the anti-theft device 700 is attached to the casing of the display device 768 such that the anti-theft device 700 cannot be detached from the display device 768 without damaging either the enclosure of the anti-theft device 700 or the casing of the display device 768.

The anti-theft system user interface 710 is provided on the enclosure of the anti-theft device 700 and it may be used by a user to selectively enable and disable the alarm function 755 executed by the host computer 750. The user interface 710 may include a numeric keypad 714 and a small LCD display 712 positioned on the exterior side of the enclosure of the anti-theft device 700 to allow the user to enter a predefined code or password using the numeric keypad to enable or disable the alarm function. Alternatively or in addition to the keypad, the user interface 710 includes a sensor 716 that scans fingerprints, which may be used to activate and deactivate the alarm function 755 executed by the computer 750. Alternatively or in addition to the user interface 710, the anti-theft device 700 may employ a wireless remote control unit 780 to activate and deactivate the alarm function by interacting with a user interface 788 (e.g., buttons) provided on the remote control unit 780. In one embodiment, LED is provided on the enclosure of the anti-theft device 700, which is used to indicate to others and to the user whether the alarm function is currently enabled or disabled.

In one embodiment, the alarm function 755 causes an audible alarm to be generated by the speaker 116 connected to the computer 750 if a movement of the anti-theft device 700 is detected while the alarm function is enabled. More specifically, the anti-theft application 754 executed by the computer 750 is in communication with the anti-theft device 700 and uses a signal forwarded by the anti-theft device 700 to determine if an audible alarm needs to be activated and/or deactivated. In one embodiment, the anti-theft application 754 running in the computer 750 is configured to cause the speaker 116 to produce an audible alarm in response to the motion signal generated by the motion sensor 704 of the anti-theft device 700 while the alarm function is enabled.

In one embodiment, an alarm function is implemented within the anti-theft device 700 in addition to or alternatively to the alarm function implemented within the computer 750. The alarm function of the anti-theft device 700 comprises a user alerting device, such as, for example, sound generator 706. The temporary power storage or rechargeable battery 708 is charged while the anti-theft device 700 is connected to receive electrical power from the computer 750. In the event the anti-theft device 700 becomes disconnected from the computer 750 and the audible alarm needs to be activated, the electrical power from the temporary power storage or rechargeable battery 708 is used to supply power to the controller 702 and the sound generator 706 to generate an audible alarm. The controller 702 of the anti-theft device 700 is configured to cause the sound generator 706 to sound an audible alarm based on a signal generated by the motion sensor 704 while the alarm function is enabled.

In one embodiment, the anti-theft system is capable of determining if the anti-theft device 700 has been unplugged or disconnected from the display device 768. This may be accomplished in a number of different ways. The unplugging of the anti-theft device 700 may be recognized by the anti-theft application 754 when a communication with the anti-theft device 700 cannot be established. Alternatively or in addition to, the unplugging of the anti-theft device 700 may be recognized by either the operating system running in the computer or the components within the display device 768 and this information may be communicated from the operating system to the anti-theft application 754. In one embodiment, the anti-theft system is configured to cause the audible alarm to be generated if it detects that the anti-theft device 700 has been unplugged or disconnected from the display device 768 while the alarm function is enabled. Additionally, the anti-theft system is configured to cause the audible alarm to be generated if it detects that the display device 768 has been disconnected from the computer 750 while the alarm function is enabled. The anti-theft device 700 may become disconnected when someone cuts the flexible cord 726 of the connector member 727 connected to the USB port 770 in an attempt to disable the alarm. In one embodiment, the anti-theft system is configured to determine if the anti-theft device 700 has been disconnected from the USB port 770 of the display device 768 and to cause the audible alarm to be generated if the disconnection of the anti-theft device 700 from the display device 768 is detected.

The anti-theft system may include a wireless remote control unit 780 to allow a user to enable and disable the alarm function 755 implemented by the computer 750 and/or the alarm function implemented by the anti-theft device 700. The remote control unit 780 comprises a number of functional elements, including a controller 782, a wireless receiver 784, a wireless transmitter 786, a user interface 788, a sound generator 790 and a battery 792. The anti-theft system is configured such that the alarm function 755 implemented by the computer 750 and/or the alarm function implemented by the anti-theft device 700 can be enabled and disabled by using the user interface 788 (e.g., buttons) provided on the remote control unit 780. The wireless signal transmitted by the transmitter 788 of the remote control unit 780 is received by the receiver 718 of the anti-theft device 700 and is processed by the controller 702 thereof. The controller 702 of the anti-theft device 700 is able to send a signal or message to the anti-theft application 754 executed by the computer 750 to enable or disable the alarm function 755 implemented by the computer 750.

In one embodiment, when a movement of the display device 768 is detected while the alarm function is enabled, the anti-theft device 700 is configured to send a signal or message to the remote control unit 780 to alert the user carrying the remote control unit 780 of a possible unauthorized taking of the display device 768. The communication from the anti-theft device 700 to the remote control unit 780 is accomplished by using the wireless transmitter 720 of the anti-theft device 700 to transmit a wireless signal or message to the remote control unit 780. When the wireless signal or message transmitted by the anti-theft device 700 is received by wireless receiver 784 of the remote control unit 780, the remote control unit 780 will cause the sound generator 790 to generate an audible alarm to alert the user carrying the remote control unit 780 of a possible theft of the display device 768.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A system comprising:
a control device connecting to a port of a computer, the control device including a wireless receiver capable of receiving wireless signals, the control device capable of enabling and disabling a security function of the computer based on a respective wireless signal received by the wireless receiver.

2. The system of claim 1, wherein the security function comprises software instructions executed by the computer which prevents access to at least a portion of a storage device of the computer when the security function is enabled.

3. The system of claim 1, wherein the control device further comprises:
a motion sensor to generate a motion signal indicating that the control device is being moved.

4. The system of claim 3, wherein the control device is capable of enabling and disabling an alarm function based on a wireless signal received by the wireless receiver.

5. The system of claim 4, wherein the alarm function comprises software instructions executed by the computer which causes an audible alarm to be generated if a movement of the control device is detected while the alarm function is enabled.

6. The system of claim 4 wherein control device simultaneously enables both the alarm function and the security function when a first signal is received by the wireless receiver of the control device from a remote control unit; and
wherein the control device simultaneously disables both the alarm function and the security function when a second signal is received by the wireless receiver of the control device from the remote control unit.

7. The system of claim 1, wherein the control device is configured to removably connect to an external port of the computer.

8. The system of claim 1, wherein the external port comprises a USB (Universal Serial Bus) port of the computer.

9. The system of claim 4, further comprising:
a remote control unit including a transmitter to transmit wireless signals to the control device to enable and disable the security function and the alarm function, and a receiver to receive wireless signals from the control device.

10. The system of claim 9, wherein the control device further comprises a transmitter to transmit a signal to the remote control unit when a movement of the control device is detected while the alarm function is enabled.

11. The system of claim 4, wherein the control device further comprises a user interface to allow the user to enable and disable the alarm function and the security function, wherein the user interface comprises at least one of a numeric keypad and a sensor configured to scan fingerprint of an authorized user.

12. A method comprising:
removably connecting a control device to an external port of a computer;
enabling and disabling a security function of the computer in response to a respective wireless signal received by the control device from a wireless remote control unit; and
preventing access to at least a portion of a storage device of the computer when the security function is enabled.

13. The method of claim 12, further comprising:
enabling an alarm function of the computer in response to a wireless signal received by the control device from the remove control unit;
detecting movement of the control device; and
causing an audible sound to be generated by the computer based on a signal generated within the control device as a result of detection of movement by the control device.

14. The method of claim 13, wherein the security function and the alarm function are enabled simultaneously when a first signal is received by a wireless receiver of the control device from the wireless remote control unit; and the security function and the alarm function are disabled simultaneously when a first signal is received by the wireless receiver of the control device from the wireless remote control unit.

15. The method of claim 12, wherein connecting the control device to the computer comprises connecting to an external port of the computer.

16. The method of claim 12, further comprising:

transmitting a signal from the control device to the remote control unit when movement of the control device is detected while the alarm function is enabled.

17. An apparatus comprising:

an enclosure;

a wireless receiver contained in the enclosure to receive wireless signals from a remote control unit;

a connector coupled to the enclosure to connect to an external port of a computer; and a controller contained in the enclosure and coupled to the wireless receiver, wherein the controller is capable of enabling and disabling a security function of the computer based on a respective wireless signal received by the wireless receiver from the remote control unit.

18. The apparatus of claim 17, wherein the security function comprises software instructions executed by the computer which prevents access to at least a portion of a storage device of the computer when the security function is enabled.

19. The apparatus of claim 17, wherein the controller capable of enabling and disabling an alarm function of the computer based on a wireless signal received by the wireless receiver from the remote control unit.

20. The apparatus of claim 19, wherein controller simultaneously enables both the alarm function and the security function when a first signal is received by the wireless receiver from the remote control unit; and wherein the controller simultaneously disables both the alarm function and the security function when a second signal is received by the wireless receiver from the remote control unit.

21. The apparatus of claim 19, further comprising:

a motion sensor contained in the enclosure to enable detection of movement of the enclosure, wherein the controller generates a motion signal indicating that the enclosure is being moved, wherein an audible alarm is generated by the computer based on the motion signal generated by the controller when the alarm function is enabled.

22. The apparatus of claim 21, further comprising:

a transmitter coupled to the controller to transmit a wireless signal to the remote control unit when movement is detected while the alarm function is enabled.

23. The apparatus of claim 17, wherein the connector is configured to removably connect to an external port of the computer.

24. The apparatus of claim 23, wherein the external port comprises a USB port of the computer.

* * * * *